US012076923B2

(12) United States Patent
Okamoto et al.

(10) Patent No.: US 12,076,923 B2
(45) Date of Patent: Sep. 3, 2024

(54) THREE-DIMENSIONAL SHAPING DEVICE

(71) Applicant: Seiko Epson Corporation, Tokyo (JP)

(72) Inventors: Eiji Okamoto, Matsumoto (JP);
Toshimitsu Hirai, Hokuto (JP); Kaoru Momose, Hara-mura (JP); Takayuki Yokoyama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/652,154

(22) Filed: Feb. 23, 2022

(65) Prior Publication Data

US 2022/0274333 A1 Sep. 1, 2022

(30) Foreign Application Priority Data

Feb. 26, 2021 (JP) .................. 2021-031033

(51) Int. Cl.
*B29C 64/357* (2017.01)
*B29C 64/209* (2017.01)
*B29C 64/393* (2017.01)
*B33Y 30/00* (2015.01)
*B33Y 50/02* (2015.01)
*B33Y 70/00* (2020.01)
*B29K 105/00* (2006.01)

(52) U.S. Cl.
CPC .......... *B29C 64/209* (2017.08); *B29C 64/393* (2017.08); *B33Y 30/00* (2014.12); *B33Y 50/02* (2014.12); *B33Y 70/00* (2014.12); *B29K 2105/0005* (2013.01)

(58) Field of Classification Search
CPC .......... B29C 64/106–112; B29C 64/165; B41J 2/01–2146
See application file for complete search history.

(56) References Cited

U.S. PATENT DOCUMENTS

| 2006/0132554 A1* | 6/2006 | Ota ...................... B41J 2/17556 347/85 |
| 2010/0245495 A1* | 9/2010 | Katada .................... B41J 2/515 347/85 |
| 2014/0118448 A1* | 5/2014 | Domae ...................... B41J 2/18 347/89 |
| 2016/0339713 A1* | 11/2016 | Nishiyama .............. B41J 2/175 |

(Continued)

FOREIGN PATENT DOCUMENTS

| JP | 2017-101232 | 6/2017 |
| JP | 2019001000 A * | 1/2019 |

OTHER PUBLICATIONS

Sawase, Machine Translation of JP2019001000A, generated Dec. 4, 2023 (Year: 2019).*

*Primary Examiner* — Philip C Tucker
*Assistant Examiner* — Andrew L Swanson
(74) *Attorney, Agent, or Firm* — WORKMAN NYDEGGER

(57) ABSTRACT

A three-dimensional shaping device includes: an ejection head including a nozzle configured to eject a binder containing water, a water-soluble resin, and a wetting agent, an individual liquid chamber communicating with the nozzle, an inflow path configured to flow the binder into the individual liquid chamber, and an outflow path configured to flow the binder out of the individual liquid chamber; and a circulation flow path configured to circulate the binder flowing out of the outflow path to the inflow path.

6 Claims, 4 Drawing Sheets

(56) References Cited

U.S. PATENT DOCUMENTS

| | | | |
|---|---|---|---|
| 2017/0217176 A1* | 8/2017 | Sato | B41J 2/04581 |
| 2018/0250885 A1* | 9/2018 | Mugishima | B33Y 50/02 |
| 2019/0255843 A1* | 8/2019 | Yamagishi | B41J 2/175 |
| 2019/0308367 A1* | 10/2019 | Maruyama | B29C 64/264 |
| 2020/0017699 A1 | 1/2020 | Brunermer | |
| 2020/0156308 A1* | 5/2020 | Ramos | B29B 7/007 |
| 2022/0193781 A1* | 6/2022 | Sells | B33Y 10/00 |

* cited by examiner ly, if a content of the wetting agent in the binder is
THREE-DIMENSIONAL SHAPING DEVICE The present application is based on, and claims priority from JP Application Serial Number 2021-031033, filed Feb. 26, 2021, the disclosure of which is hereby incorporated by reference herein in its entirety.

BACKGROUND

1. Technical Field

The present disclosure relates to a three-dimensional shaping device.

2. Related Art

For example, as shown in US 2020/0017699, there has been a three-dimensional shaping device that manufactures a three-dimensional shaped object by a binder method of ejecting a binder to a powder bed. In the three-dimensional shaping device described in US 2020/0017699, by setting an amount of polyvinyl alcohol contained in the binder to 3% by mass to 7% by mass with respect to the binder, a shaped object in which a carbon content is reduced can be obtained while maintaining a binding property of shaping materials.

However, the binder used in the three-dimensional shaping device described in US 2020/0017699 contains a glycol ether as a wetting agent in an amount of 3% by mass to 7% by mass with respect to the binder. Therefore, the carbon content of the shaped object cannot be sufficiently reduced by merely lowering a proportion of a binding agent. On the other hand, if a content of the wetting agent in the binder is lowered, an ejection stability of the binder may be lowered.

SUMMARY

A three-dimensional shaping device according to the present disclosure includes: an ejection head including a nozzle configured to eject a binder containing water, a water-soluble resin, and a wetting agent, an individual liquid chamber communicating with the nozzle, an inflow path configured to flow the binder into the individual liquid chamber, and an outflow path configured to flow the binder out of the individual liquid chamber; and a circulation flow path configured to circulate the binder flowing out of the outflow path to the inflow path.

DESCRIPTION OF EXEMPLARY EMBODIMENTS

Embodiment

Figure 1:
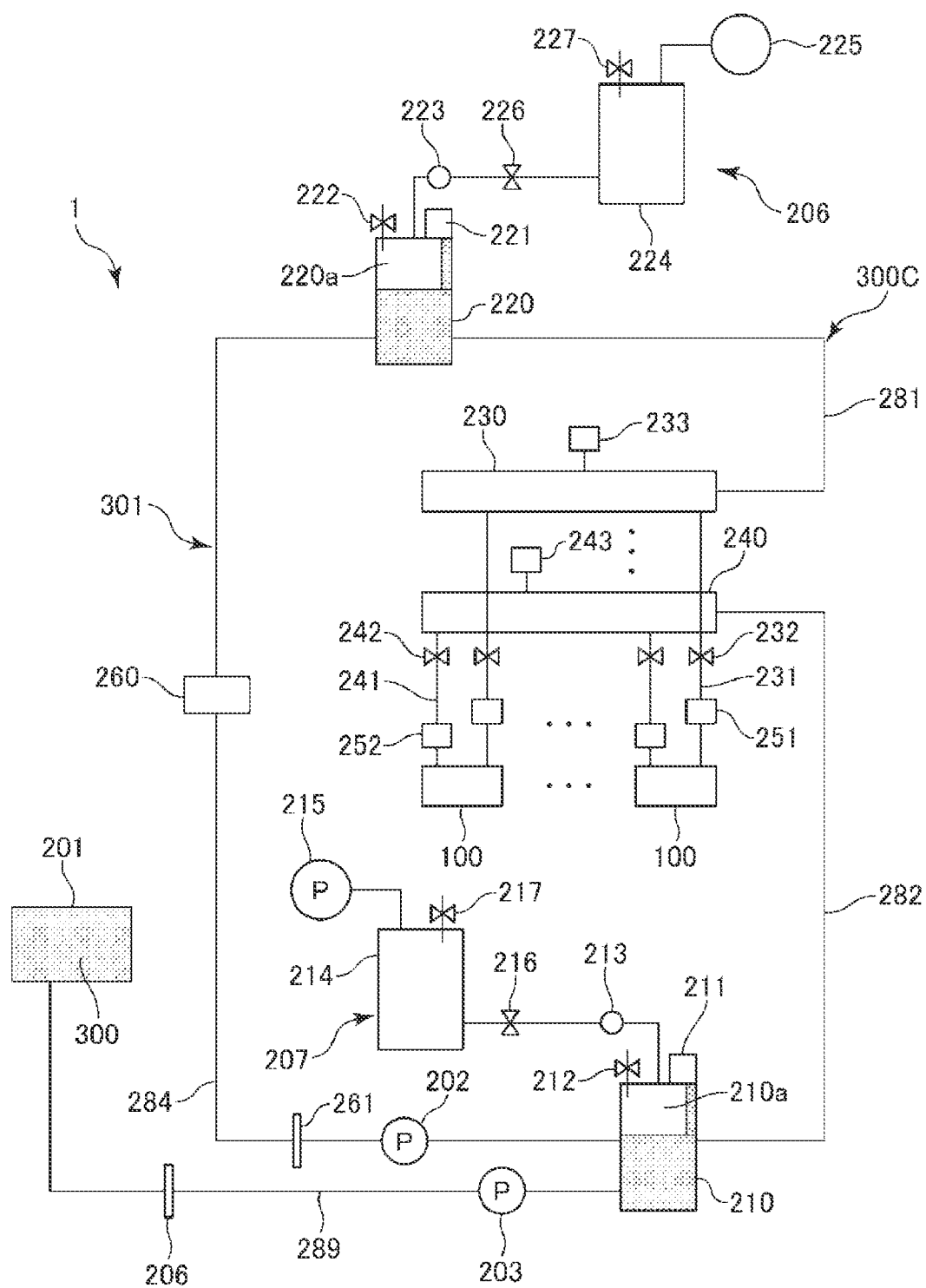
FIG. 1 is a schematic configuration diagram of a three-dimensional shaping device according to the disclosure.
Figure 2:
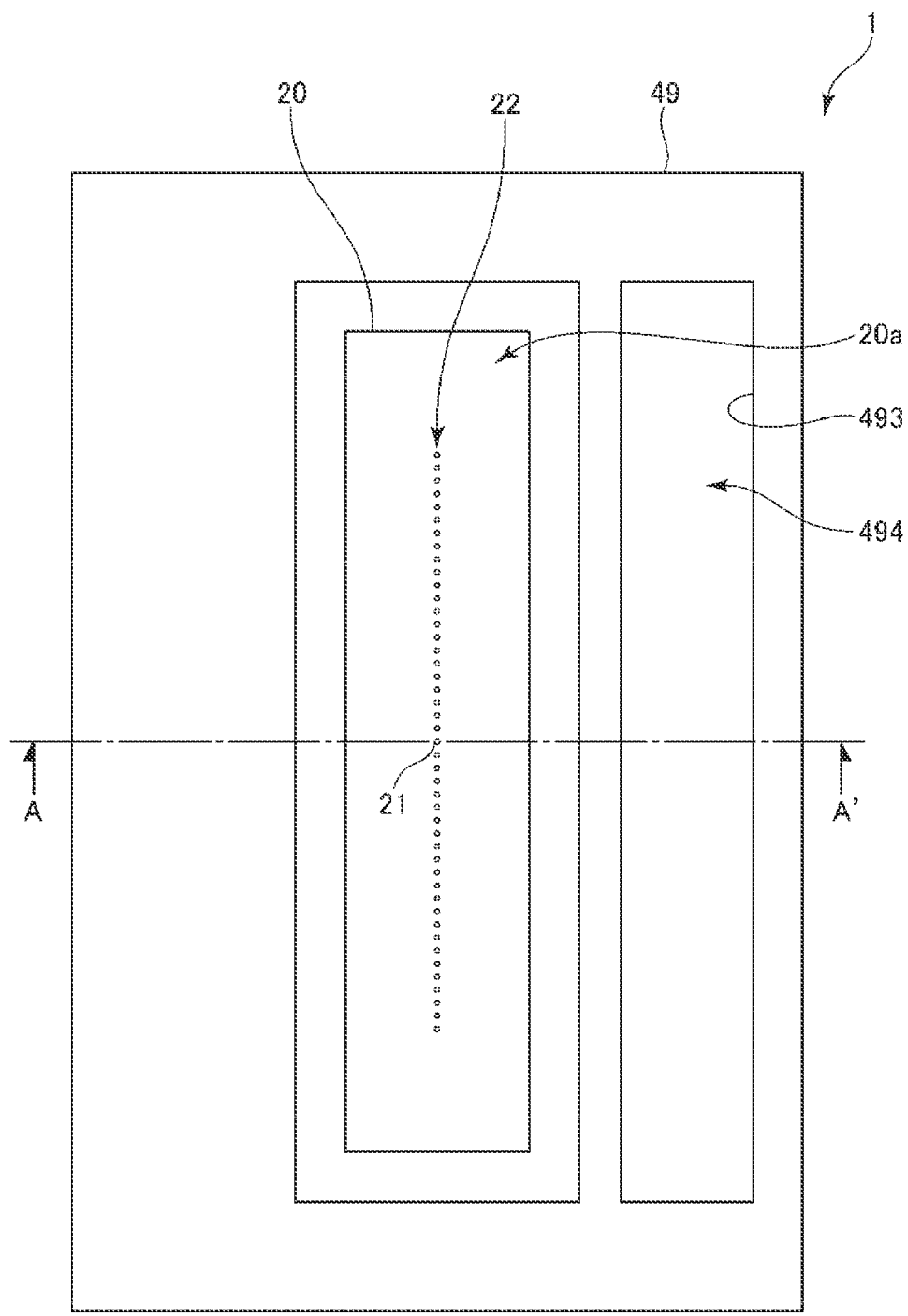
FIG. 2 is a plan view of an ejection head shown in FIG. 1.
Figure 3:
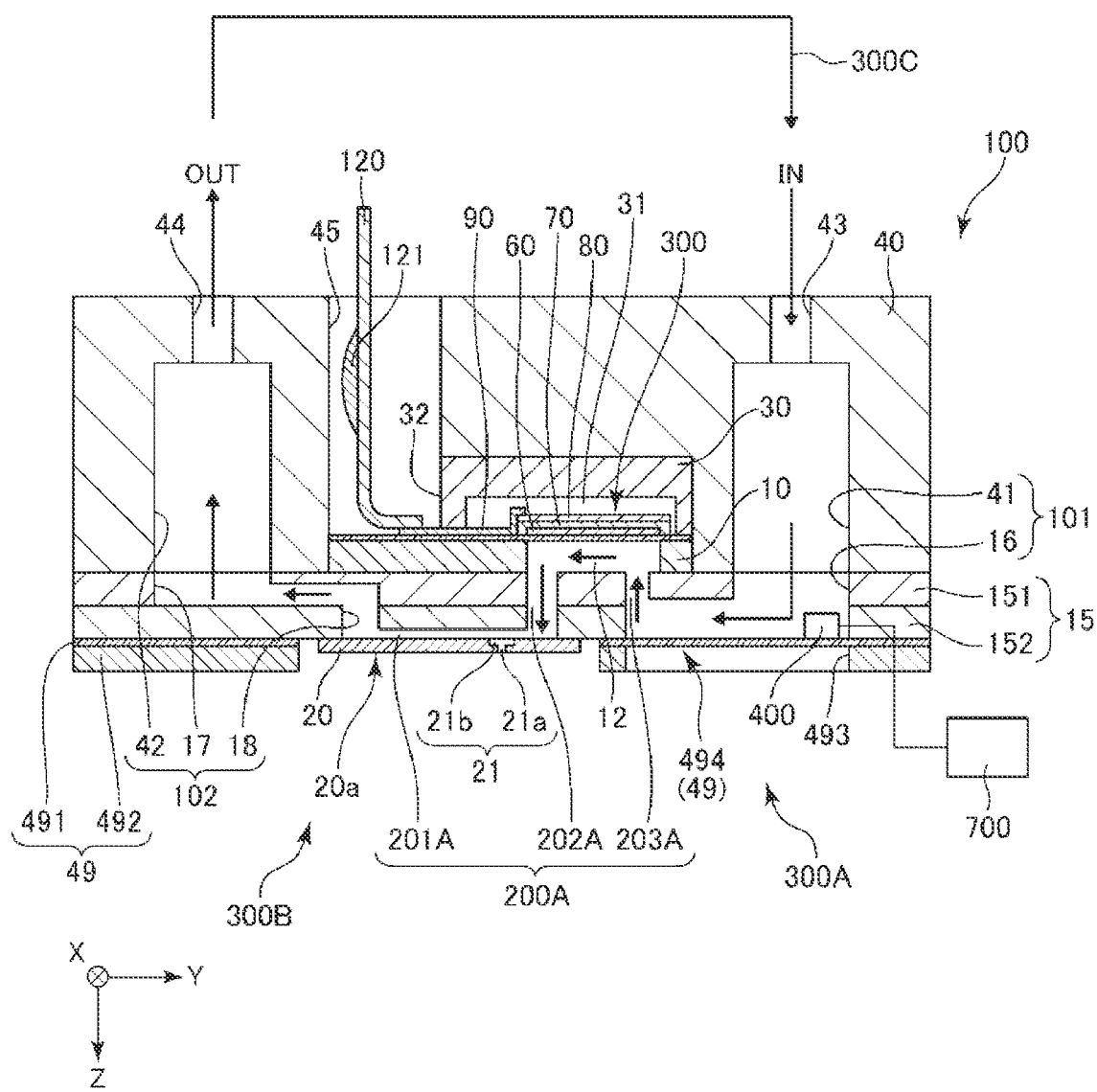
FIG. 3 is a cross-sectional view of the ejection head shown in FIG. 1.
Figure 4:
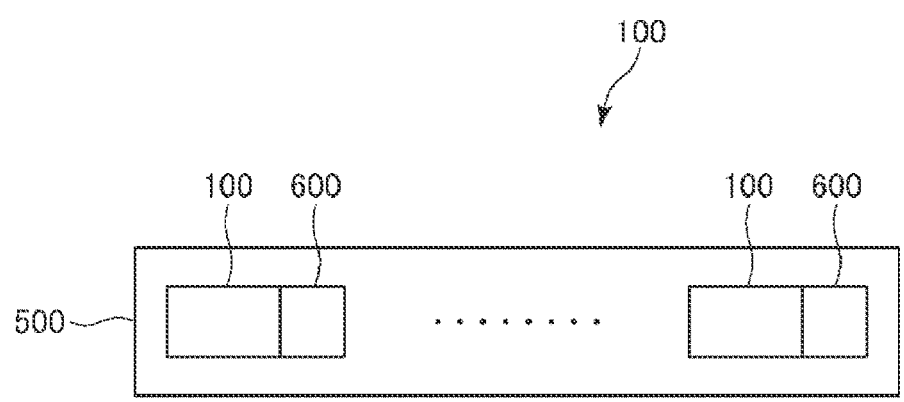
FIG. 4 is a schematic view of a carriage that supports the ejection head shown in FIG. 1.

FIG. 1 is a schematic configuration diagram of a three-dimensional shaping device according to the disclosure. FIG. 2 is a plan view of an ejection head shown in FIG. 1. FIG. 3 is a cross-sectional view of the ejection head shown in FIG. 1. FIG. 4 is a schematic view of a carriage that supports the ejection head shown in FIG. 1.

Hereinafter, a three-dimensional shaping device will be described in detail based on a preferred embodiment shown in the accompanying drawings. FIG. 2 and FIG. 3 show an X axis, a Y axis, and a Z axis that are orthogonal to each other, where a distal end side of an arrow of each axis is a "+" side, and a proximal end side of the arrow of each axis is a "−" side.

The three-dimensional shaping device 1 includes plural ejection heads 100 that eject a binder to a powder bed, which is not shown, a main tank 201 that stores the binder ejected from the ejection heads 100, a depressurizing sub-tank 210, a pressurizing sub-tank 220, a first feeding pump 202, a second feeding pump 203, a first manifold 230, a second manifold 240, head tanks 251, head tanks 252, and a deaeration device 260.

The first feeding pump 202 feeds the binder from the depressurizing sub-tank 210 to the pressurizing sub-tank 220 via a binder path 284. The binder path 284 is provided with the deaeration device 260 and a filter 261. The deaeration device 260 removes dissolved gas in the binder. The filter 261 traps and removes foreign matters in the binder.

The second feeding pump 203 feeds the binder from the main tank 201 to the depressurizing sub-tank 210 via a binder path 289. The binder path 289 is provided with a filter that traps and removes the foreign matters in the binder.

The depressurizing sub-tank 210 includes a gas chamber 210*a* in which the binder and a gas coexist. The depressurizing sub-tank 210 is provided with a liquid level detecting unit 211 that detects a liquid level and a solenoid valve 212 that opens the gas chamber 210*a* to the atmosphere.

The depressurizing sub-tank 210 is coupled to a second adjusting device 207 that depressurizes an inside of the depressurizing sub-tank 210. The second adjusting device 207 includes a regulator 213, a depressurizing buffer tank 214, and a vacuum pump 215 that is a gas pump. A solenoid valve 216 is provided between the regulator 213 and the depressurizing buffer tank 214. The depressurizing buffer tank 214 is provided with a solenoid valve 217.

The pressurizing sub-tank 220 includes a gas chamber 220*a* in which the binder and a gas coexist. The pressurizing sub-tank 220 is provided with a liquid level detecting unit 221 that detects a liquid level and a solenoid valve 222 serving as an air opening mechanism that opens an inside of the pressurizing sub-tank 220 to the atmosphere.

The pressurizing sub-tank 220 is coupled to a first adjusting device 206 that pressurizes the inside of the pressurizing sub-tank 220. The first adjusting device 206 includes a regulator 223, a pressurizing buffer tank 224, and a compressor 225. A solenoid valve 226 is provided between the regulator 223 and the pressurizing buffer tank 224. The pressurizing buffer tank 224 is provided with a solenoid valve 227.

The pressurizing sub-tank 220 is coupled to the first manifold 230 via a binder path 281.

The first manifold 230 is coupled to a supply port side of each ejection head 100 via a supply flow path 231. The supply flow path 231 is coupled to a supply port of the ejection head 100 via the head tank 251. The supply flow path 231 is provided with a solenoid valve 232 that opens and closes a path upstream of the head tank 251. The first manifold 230 is provided with a pressure sensor 233.

The depressurizing sub-tank 210 is coupled to the second manifold 240 via a binder path 282.

The second manifold 240 is coupled to a discharge port of the ejection head 100 via a discharge flow path 241. The discharge flow path 241 is coupled to the discharge port of the ejection head 100 via the head tank 252. The discharge flow path 241 is provided with a solenoid valve 242 that opens and closes a path downstream of the head tank 252. The second manifold 240 is provided with a pressure sensor 243.

A path that passes the depressurizing sub-tank 210, the binder path 284, the deaeration device 260, the pressurizing sub-tank 220, the binder path 281, the first manifold 230, the ejection heads 100, the second manifold 240, and the depressurizing sub-tank 210, and then returns to the pressurizing sub-tank 220 constitutes a circulation path 301. When an amount of circulating liquid in the circulation path 301 is smaller than a predetermined amount, the main tank 201 is replenished with the binder from the depressurizing sub-tank 210.

In the present embodiment, the first manifold 230 is disposed at a position higher than that of the second manifold 240.

The pressurizing sub-tank 220 is disposed at a position higher than a position at which the supply port, which is a supply opening of the ejection head 100, is disposed. Specifically, the pressurizing sub-tank 220 is disposed such that an inner bottom surface of the pressurizing sub-tank 220 is higher than the supply port of the ejection head 100.

On the other hand, the depressurizing sub-tank 210 is disposed at a position lower than a position at which the discharge port, which is a discharge opening of the ejection head 100, is disposed. Specifically, the depressurizing sub-tank 210 is disposed such that a liquid level of the binder housed in the depressurizing sub-tank 210 is lower than the discharge port of the ejection head 100.

Next, a method for circulating the binder in the three-dimensional shaping device 1 will be described.
(1) Binder Flow from Main Tank 201 to Depressurizing Sub-Tank 210

When the liquid level detecting unit 211 detects that the depressurizing sub-tank 210 is short of the binder, the second feeding pump 203 is driven to supply the binder from the main tank 201 to the depressurizing sub-tank 210 via the binder path 289 until the liquid level becomes full based on a detection result of the liquid level detecting unit 211.
(2) Binder Flow from Depressurizing Sub-Tank 210 to Pressurizing Sub-Tank 220

The first feeding pump 202 can be driven to feed the binder from the depressurizing sub-tank 210 to the pressurizing sub-tank 220 via the binder path 284.
(3) Binder Flow from Pressurizing Sub-Tank 220 to Ejection Head 100 to Depressurizing Sub-Tank 210

The pressurizing sub-tank 220 is set to a target pressure (for example, a pressure that is pressurized) by the first adjusting device 206. On the other hand, the depressurizing sub-tank 210 is set to a target pressure (for example, a pressure that is negative) by the second adjusting device 207.

Accordingly, a differential pressure is generated between the pressurizing sub-tank 220 and the depressurizing sub-tank 210. According to the differential pressure, the binder can be circulated from the pressurizing sub-tank 220 to the depressurizing sub-tank 210 via the binder path 281, the first manifold 230, plural supply flow paths 231, the plural head tanks 251, the plural ejection heads 100, the plural head tanks 252, the plural discharge flow paths 241, the second manifold 240, and the binder path 282.

The liquid level detecting units 211 and 221 can use a float type binder detecting method, a method for detecting presence or absence of the binder according to an output of a voltage detected by using at least two electrode pins, a liquid level detecting method using a laser, or the like.

By driving the solenoid valves 222 and 212, the inside of the pressurizing sub-tank 220 and the depressurizing sub-tank 210 can be communicated with the atmosphere.

Next, configurations of the ejection heads 100 will be described in detail. Since the configuration of each ejection head 100 is the same, one ejection head 100 will be described as a representative.

As shown in FIG. 3, the ejection head 100 includes plural members such as a flow path forming substrate 10, a communicating plate 15, a nozzle plate 20, a protective substrate 30, a case member 40, and a compliance substrate 49 as a flow path substrate.

The flow path forming substrate 10 includes a silicon single crystal substrate, and has one surface formed with a diaphragm. The diaphragm includes a single layer or a laminate selected from a silicon dioxide layer and a zirconium oxide layer.

The flow path forming substrate 10 is provided with plural pressure chambers 12, which are individual liquid chambers, partitioned by plural partition walls. The plural pressure chambers 12 are arranged in parallel at a predetermined pitch along an X-axis direction in which plural nozzles 21 that eject the binder are arranged in parallel. The pressure chambers 12 are arranged in one row in parallel in the X-axis direction in the present embodiment. The flow path forming substrate 10 is disposed such that an in-plane direction thereof is a direction including the X-axis direction and a Y-axis direction. In the present embodiment, each portion between the pressure chambers 12 arranged in parallel in the X-axis direction of the flow path forming substrate 10 is referred to as the partition wall. The partition wall is formed along the Y-axis direction. That is, the partition wall means a portion overlapping the pressure chambers 12 of the flow path forming substrate 10 in the Y-axis direction.

In the present embodiment, the flow path forming substrate 10 is provided with only the pressure chambers 12, but may also be provided with a flow path resistance imparting portion having a cross-sectional area across a flow path smaller than that of the pressure chambers 12 so as to impart flow path resistance to the binder supplied to the pressure chamber 12.

The diaphragm is formed on one surface of the flow path forming substrate 10 in a −Z-axis direction. A first electrode 60, a piezoelectric layer 70, and a second electrode 80 are laminated on the diaphragm by a film forming method and a lithography method to form a piezoelectric actuator 300. In the present embodiment, the piezoelectric actuator 300 is an energy generating element that causes a pressure change in the binder in the pressure chamber 12. The piezoelectric actuator 300 is also referred to as a piezoelectric element, and means a portion including the first electrode 60, the piezoelectric layer 70, and the second electrode 80. In general, a common electrode is used as one electrode of each piezoelectric actuator 300, and the other electrode and the piezoelectric layer 70 are patterned for each pressure chamber 12. In the present embodiment, the first electrode 60 is the common electrode of the piezoelectric actuator 300, and the second electrode 80 is the individual electrode of the piezoelectric actuator 300, but there is no problem vice versa for the sake of a drive circuit or a wiring. In the example described above, the diaphragm and the first electrode 60 act as a diaphragm, but the disclosure is not limited to this, and for example, the first electrode 60 may act as a diaphragm alone without providing the diaphragm. The piezoelectric actuator 300 may also serve as a diaphragm per se.

The second electrode 80 of each piezoelectric actuator 300 is coupled to a lead electrode 90, so as to selectively apply a voltage to each piezoelectric actuator 300 via the lead electrode 90. The protective substrate 30 is bonded to the surface of the flow path forming substrate 10 in the −Z-axis direction.

The protective substrate 30 has a region facing the piezoelectric actuator 300 that is provided with a piezoelectric actuator holding portion 31 having a space that does not inhibit movement of the piezoelectric actuator 300. The piezoelectric actuator holding portion 31 may have any space as long as the space does not inhibit the movement of the piezoelectric actuator 300, and the space may or may not be sealed. The piezoelectric actuator holding portion 31 is formed in a size that integrally covers the row of the plural piezoelectric actuators 300 arranged in parallel in the X-axis direction. Naturally, the piezoelectric actuator holding portion 31 is not particularly limited thereto, and may cover the piezoelectric actuators 300 individually, or may cover the piezoelectric actuators 300 in groups each including two or more in parallel in the X-axis direction.

Such a protective substrate 30 is preferably formed of a material having substantially the same thermal expansion coefficient as that of the flow path forming substrate 10, such as glass or ceramic material. In the present embodiment, the protective substrate 30 is formed by using a silicon single crystal substrate made of the same material as the flow path forming substrate 10.

The protective substrate 30 is provided with a through-hole 32 penetrating the protective substrate 30 in a Z-axis direction. The vicinity of an end of the lead electrode 90 drawn from each piezoelectric actuator 300 is extended so as to be exposed in the through-hole 32, and is electrically coupled to a flexible cable 120 in the through-hole 32. The flexible cable 120 is a flexible wiring substrate, and in the present embodiment, is mounted with a driving circuit 121, which is a semiconductor element. The lead electrode 90 and the drive circuit 121 may be electrically coupled to each other without using the flexible cable 120. The protective substrate 30 may be provided with a flow path.

The case member 40, which defines supply flow paths communicating with the plural pressure chambers 12 together with the protective substrate 30, is fixed on the protective substrate 30. The case member 40 is bonded to a side of the protective substrate 30 opposite to the flow path forming substrate 10, and is bonded to the communicating plate 15 described later.

The case member 40 is provided with a first liquid chamber portion 41 that constitutes a part of a first common liquid chamber 101 and a second liquid chamber portion 42 that constitutes a part of a second common liquid chamber 102. The first liquid chamber portion 41 and the second liquid chamber portion 42 are provided on both sides in the Y-axis direction of the pressure chambers 12 in one row.

The first liquid chamber portion 41 and the second liquid chamber portion 42 have a concave shape opening on a surface on a −Z side of the case member 40, and are provided continuously over the plural pressure chambers 12 arranged in parallel in the X axis direction.

The case member 40 is provided with a supply opening 43 that communicates with the first liquid chamber portion 41 and supplies the binder to the first liquid chamber portion 41, and a discharge opening 44 that communicates with the second liquid chamber portion 42 and discharges the binder from the second liquid chamber portion 42.

Further, the case member 40 is provided with a coupling opening 45 that communicates with the through-hole of the protective substrate 30 and that allows the flexible cable 120 to be inserted therethrough.

On the other hand, the communicating plate 15, the nozzle plate 20, and the compliance substrate 49 are provided on a +Z side of the flow path forming substrate 10, which is opposite to the protective substrate 30.

The plural nozzles 21, which inject the binder in a +Z-axis direction, are formed in the nozzle plate 20. In the present embodiment, as shown in FIG. 2, the plural nozzles 21 are disposed in a straight line along an X-axis direction to form one nozzle row 22.

Each nozzle 21 includes a first nozzle 21a and a second nozzle 21b that have different inner diameters and are disposed in parallel in the Z-axis direction, which is a plate thickness direction of the nozzle plate 20. The inner diameter of the first nozzle 21a is smaller than that of the second nozzle 21b. The first nozzle 21a is disposed on an outer side of the nozzle plate 20, that is, on the +Z side. The binder is injected as binder droplets in the +Z-axis direction from the first nozzle 21a to an outside. That is, a second axial direction in which the binder of the present embodiment is ejected is the Z-axis direction in the present embodiment.

The second nozzle 21b is disposed on the −Z side of the nozzle plate 20 and communicates with a first flow path 201A extending in the Y-axis direction. That is, a first axial direction, which is an extending direction of the first flow path 201A, is the Y-axis direction in the present embodiment. The Y-axis direction, which is the first axial direction, and the Z-axis direction, which is the second axial direction, are orthogonal to each other.

By providing the first nozzle 21a having a relatively small inner diameter in the nozzles 21 in this way, a flow rate of the binder is improved, and a flying speed of the binder droplets injected from the nozzle 21 can be improved. By providing the second nozzle 21b having a relatively large inner diameter in the nozzles 21, a portion that is not affected by a flow in circulation can be reduced in the nozzle 21 when the binder in the individual flow path 200A is circulated to flow from the first common liquid chamber 101 toward the second common liquid chamber 102, which will be described later in detail. That is, the binder can be flown in the second nozzle 21b during the circulation, and a speed gradient in the nozzle 21 can be increased, so that the binder in the nozzle 21 can be replaced with a new binder supplied from the upstream. However, if the inner diameter of the second nozzle 21b is too large as compared to that of the first nozzle 21a, a ratio between inertances of the second nozzle 21b and the first nozzle 21a is increased, and a position of a meniscus of the binder in the nozzle 21 is not stable when the binder droplets are ejected continuously. That is, when the ratio between the inertances of the second nozzle 21b and the first nozzle 21a is increased, the meniscus of the binder does not stay in the first nozzle 21a and moves into the second nozzle 21b, and stable ejection of the binder droplets cannot be performed continuously.

If the inner diameter of the second nozzle 21b is too small, the flow of the binder is less likely to occur in the second nozzle 21b during the circulation. If the inner diameter of the second nozzle 21b is too small, the flow path resistance from the pressure chamber 12 to the nozzle 21 increases, and a pressure loss increases, so that a weight of the binder droplets ejected from the nozzle 21 becomes small. Therefore, the piezoelectric actuator 300 needs to be driven at a higher driving voltage, which reduces an ejection efficiency. Thus, sizes of the first nozzle 21a and the second nozzle 21b are appropriately determined in consideration of replacement performance of the binder during the circulation, the ejection stability, the ejection efficiency, the flying speed of the binder, and the like.

The first nozzle 21a and the second nozzle 21b have opening shapes each being substantially the same over the Z-axis direction. Accordingly, a step is formed between the first nozzle 21a and the second nozzle 21b. Naturally, the shapes of the first nozzle 21a and the second nozzle 21b are not limited thereto, and, for example, the second nozzle 21b may have an inner surface that is a surface inclined with respect to the Z-axis direction. That is, the inner diameter of the second nozzle 21b may gradually decrease toward the first nozzle 21a. Accordingly, for example, the first nozzle 21a and the second nozzle 21b may have continuous inner surfaces without a step being formed therebetween. When the inner surfaces of the first nozzle 21a and the second nozzle 21b are continuous in this way, the first nozzle 21a means that the opening shape is a portion having substantially the same shape over the Z-axis direction.

The shape of the nozzle 21 in a plan view from the Z-axis direction is not particularly limited, and may be a circular shape, an elliptical shape, a rectangular shape, a polygonal shape, a potbellied shape, or the like.

The nozzle plate 20 can be formed with a plate-shaped member made of, for example, a metal such as stainless steel (SUS), an organic material such as a polyimide resin, or silicon, etc. The nozzle plate 20 preferably has a plate thickness of 60 μm or more and 100 μm or less. Such a plate thickness of the nozzle plate 20 can improve a handling property of the nozzle plate 20, and improve an assembling property of the ejection head 100. Incidentally, by shortening a length of the nozzle 21 in the Z-axis direction, the portion that is not affected by the flow in the circulation in the nozzle 21 can be reduced when the binder is circulated, but in order to shorten the length of the nozzle 21 in the Z-axis direction, it is necessary to reduce the thickness of the nozzle plate 20 in the Z-axis direction. When the thickness of the nozzle plate 20 is reduced in this way, rigidity of the nozzle plate 20 is reduced, deformation of the nozzle plate 20 tends to cause variations in the ejection direction of the binder droplets, and the assembling property is likely to be deteriorated due to deterioration of the handling property of the nozzle plate 20. That is, the nozzle plate 20 having a certain thickness as described above can limit deterioration of the rigidity of the nozzle plate 20, and limit the variations in the ejection direction due to the deformation of the nozzle plate 20 and the deterioration of the assembling property due to the deterioration of the handling property.

In the present embodiment, the communicating plate 15 includes a first communicating plate 151 and a second communicating plate 152. The first communicating plate 151 and the second communicating plate 152 are laminated in the Z-axis direction such that the first communicating plate 151 is on the −Z side and the second communicating plate 152 is on the +Z side.

The first communicating plate 151 and the second communicating plate 152, which constitute the communicating plate 15, can be manufactured with a metal such as stainless steel, glass, a ceramic material, or the like. The communicating plate 15 preferably uses a material having substantially the same thermal expansion coefficient as the flow path forming substrate 10, and in the present embodiment, the communicating plate 15 is formed by using a silicon single crystal substrate made of the same material as the flow path forming substrate 10.

The communicating plate 15 is provided with a first communicating portion 16 that communicates with the first liquid chamber portion 41 of the case member 40 to form a part of the first common liquid chamber 101, and a second communicating portion 17 and a third communicating portion 18 that communicate with the second liquid chamber portion 42 of the case member 40 to form a part of the second common liquid chamber 102. The communicating plate 15 is provided with flow paths that communicate the first common liquid chamber 101 with the pressure chambers 12, flow paths that communicate the pressure chambers 12 with the nozzles 21, and flow paths that communicate the nozzles 21 with the second common liquid chamber 102, which will be described in detail later. These flow paths provided in the communicating plate 15 constitute a part of the individual flow path 200A.

The first communicating portion 16 is provided at a position overlapping the first liquid chamber portion 41 of the case member 40 in the Z-axis direction, and passes through the communicating plate 15 in the Z-axis direction so as to open on both a surface on the +Z side and a surface on the −Z side of the communicating plate 15. The first communicating portion 16 constitutes the first common liquid chamber 101 by communicating with the first liquid chamber portion 41 on the −Z side. That is, the first common liquid chamber 101 includes the first liquid chamber portion 41 of the case member 40 and the first communicating portion 16 of the communicating plate 15. The first communicating portion 16 extends in a −Y-axis direction to a position overlapping the pressure chamber 12 in the Z-axis direction on the +Z side. The first common liquid chamber 101 may include the first liquid chamber portion 41 of the case member 40 without providing the first communicating portion 16 in the communicating plate 15.

The second communicating portion 17 is provided at a position overlapping the second liquid chamber portion 42 of the case member 40 in the Z-axis direction, and opens on a surface on the −Z side of the first communicating plate 151. The second communicating portion 17 is widened toward the nozzles 21 in a +Y axis direction on the +Z side.

The third communicating portion 18 passes through the second communicating plate 152 in the Z-axis direction so as to have one end communicates with a portion of the second communicating portion 17 that is widened in the +Y-axis direction. The third communicating portion 18 has an opening on the +Z side covered by the nozzle plate 20. That is, by providing the second communicating portion 17 in the first communicating plate 151, the opening on the +Z side of the third communicating portion 18 can be covered alone by the nozzle plate 20, so that the nozzle plate 20 can be provided in a relatively narrow area, which reduces costs.

The second common liquid chamber 102 is constituted by the second communicating portion 17 and the third communicating portion 18 provided in the communicating plate 15 and the second liquid chamber portion 42 provided in the case member 40. The second common liquid chamber 102 may be constituted by the second liquid chamber portion of the case member 40 without providing the second communicating portion 17 and the third communicating portion 18 in the communicating plate 15.

The compliance substrate 49, which includes a compliance portion 494, is provided on the surface on the +Z side of the communicating plate 15 where the first communicating portion 16 opens. The compliance substrate 49 seals an opening of the first common liquid chamber 101 on a nozzle surface 20a side.

In the present embodiment, the compliance substrate 49 includes a flexible sealing film 491 made of a thin film and a fixed substrate 492 made of a hard material such as metal. The fixed substrate 492 has a region facing the first common liquid chamber 101 that is an opening 493 completely removed in a thickness direction, so that a part of a wall surface of the first common liquid chamber 101 is the compliance portion 494, which is a flexible portion sealed only by the flexible sealing film 491. By providing the compliance portion 494 on a part of the wall surface of the first common liquid chamber 101 in this way, the compliance portion 494 can be deformed to absorb a pressure fluctuation of the binder in the first common liquid chamber 101.

The compliance portion 494 is provided with, on a −Z-axis side thereof, a pressure sensor 400 that detects a pressure in the first common liquid chamber 101. The pressure sensor 400 is electrically coupled to a control unit 700. Information on the pressure in the first common liquid chamber 101 detected by the pressure sensor 400 is transmitted to the control unit 700.

The flow path forming substrate 10, the communicating plate 15, the nozzle plate 20, the compliance substrate 49, and the like constituting the flow path substrate are provided with plural individual flow paths 200A that communicate with the first common liquid chamber 101 and the second common liquid chamber 102 to feed the binder in the first common liquid chamber 101 to the second common liquid chamber 102. The individual flow paths 200A according to the present embodiment are provided for the respective nozzles 21 in a manner communicating with the first common liquid chamber 101 and the second common liquid chamber 102, and each include one nozzle 21. The plural individual flow paths 200A are arranged in parallel along the X-axis direction in which the nozzles 21 are arranged in parallel. Two individual flow paths 200A adjacent to each other in the X-axis direction, in which the nozzles 21 are arranged in parallel, communicate with the first common liquid chamber 101 and the second common liquid chamber 102, respectively. That is, the plural individual flow paths 200A provided for the respective nozzles 21 communicate with each other only in the first common liquid chamber 101 and the second common liquid chamber 102, and the plural individual flow paths 200A do not communicate with each other except in the first common liquid chamber 101 and the second common liquid chamber 102. That is, in the present embodiment, each flow path including one nozzle 21 and one pressure chamber 12 is referred to as one individual flow path 200A, and the individual flow paths 200A communicate with each other only in the first common liquid chamber 101 and the second common liquid chamber 102.

As shown in FIG. 3, the individual flow path 200A includes the nozzle 21, the pressure chamber 12, the first flow path 201A, a second flow path 202A, and a supply path 203A.

As described above, the pressure chamber 12 is provided between a concave portion provided in the flow path forming substrate 10 and the communicating plate 15, and extends in the Y-axis direction. That is, the pressure chamber 12 has one end in the Y-axis direction coupled to the supply path 203A and the other end in the Y-axis direction coupled to the second flow path 202A, and the binder flows in the Y-axis direction in the pressure chamber 12. That is, the direction in which the pressure chamber 12 extends refers to a direction in which the binder flows in the pressure chamber 12.

In the present embodiment, the flow path forming substrate 10 is provided with only the pressure chamber 12, but the disclosure is not limited thereto. An upstream end of the pressure chamber 12, that is, an end in the +Y axis direction, may be provided with a flow path resistance imparting portion having a cross-sectional area smaller than that of the pressure chamber 12, so as to impart the flow path resistance.

The supply path 203A couples the pressure chamber and the first common liquid chamber 101, and passes through the first communicating plate 151 in the Z-axis direction. The supply path 203A has an end on the +Z side communicating with the first common liquid chamber 101 and an end on the −Z side communicating with the pressure chamber 12. That is, the supply path 203A extends in the Z-axis direction. Here, the direction in which the supply path 203A extends refers to a direction in which the binder flows in the supply path 203A.

The first flow path 201A extends in the Y-axis direction between the supply opening 43 and the discharge opening 44. The direction in which the first flow path 201A extends refers to a direction in which the binder flows in the first flow path 201A. That is, the first axial direction in which the first flow path 201A extends is the Y-axis direction in the present embodiment. The first flow path 201A has an end in the +Y-axis direction communicating with the second flow path 202A and an end in the −Y-axis direction communicating with the third communicating portion 18 of the second common liquid chamber 102.

The first flow path 201A of the present embodiment extends along the Y-axis direction between the second communicating plate 152 and the nozzle plate 20.

Specifically, the first flow path 201A is formed by providing a concave portion in the second communicating plate 152 and covering an opening of the concave portion by the nozzle plate 20. The first flow path 201A is not particularly limited thereto. The nozzle plate 20 may be provided with a concave portion, the concave portion of the nozzle plate 20 may be covered by the second communicating plate 152, and both the second communicating plate 152 and the nozzle plate 20 may be provided with concave portions.

In the present embodiment, the first flow path 201A has the same cross-sectional area across the binder flowing through the flow path, that is, the same cross-sectional area in a planar direction including the X-axis direction and the Z-axis direction, over the Y-axis direction. The first flow path 201A may have different cross-sectional areas across the first flow path 201A in the Y-axis direction. Areas across the first flow path 201A being different includes different heights in the Z-axis direction, different widths in the X-axis direction, and both different heights and widths.

The first flow path 201A has a rectangular shape of a cross-section across the flow path, that is, a rectangular shape of a cross section in the planar direction including the X-axis direction and the Z-axis direction. The shape of the cross-section across the flow path of the first flow path 201A is not particularly limited, and may be a trapezoidal shape, a semicircular shape, a semi-elliptical shape, or the like.

The second flow path 202A extends in the Z-axis direction between the pressure chamber 12 and the first flow path 201A. The direction in which the second flow path 202A extends refers to a direction in which the binder flows in the second flow path 202A. That is, the direction in which the second flow path 202A extends is the same as the second axial direction and is the Z-axis direction in the present embodiment. In the present embodiment, the second flow path 202A passes through the communicating plate 15 in the Z-axis direction, and has an end in the −Z-axis direction communicating with the pressure chamber 12 and an end in the +Z-axis direction communicating with the first flow path 201A.

The second flow path 202A means a portion formed in the communicating plate 15. That is, the second flow path 202A is from a bottom surface of the pressure chamber in the +Z-axis direction to a portion covered by the nozzle plate 20.

The nozzle 21 is disposed at a position communicating with the middle of the first flow path 201A. That is, the nozzle 21 branches in the +Z-axis direction from the first flow path 201A extending in the Y-axis direction. Accordingly, the binder droplets are injected from the nozzle 21 in the +Z-axis direction. That is, the nozzle 21 passes through the nozzle plate 20 in the Z-axis direction so as to have an end in the −Z-axis direction communicating with the middle of the first flow path 201A and an end in the +Z-axis direction opening on the nozzle surface 20a of the nozzle plate 20. Therefore, the second axial direction in which the nozzle 21 injects the binder droplets refers to the Z-axis direction.

The nozzle 21 branching from the first flow path 201A means that the nozzle 21 communicates with the middle of the first flow path 201A. The nozzle 21 communicating with the middle of the first flow path 201A means that the nozzle 21 is disposed at a position overlapping the first flow path 201A when viewed in plan from the Z-axis direction. Incidentally, the nozzle 21 being disposed at a position overlapping the second flow path 202A when viewed in plan from the Z-axis direction does not mean that the nozzle 21 communicates with the middle of the first flow path 201A. That is, the first flow path 201A according to the present embodiment is a portion that does not overlap the second flow path 202A when viewed in plan from the Z-axis direction.

A cross-sectional area across the binder flowing through the first flow path 201A that communicates with the nozzle 21 is preferably smaller than a cross-sectional area across the binder flowing through the second flow path 202A. The cross-sectional area across the first flow path 201A is an area of the cross section in the planar direction including the X-axis direction and the Z-axis direction. The cross-sectional area across the second flow path 202A is an area of a cross section in a planar direction including the Y-axis direction and the Z-axis direction. Such relatively small cross-sectional area of the first flow path 201A allows the individual flow paths 200A and the nozzles 21 to be disposed at a high density in the X-axis direction, and prevents the ejection head 100 from becoming larger in the Z-axis direction. In addition, a relatively large cross-sectional area of the second flow path 202A can limit a decrease in the flow path resistance from the pressure chamber 12 to the nozzle 21, and can limit deterioration in an ejection characteristic of the binder, particularly a decrease in the weight of the ejected liquid droplets. In particular, by expanding the second flow path 202A in the Y-axis direction so as to increase the cross-sectional area of the second flow path 202A, the flow path resistance of the second flow path 202A can be reduced while preventing the individual flow paths 200A from being disposed at a low density, so that the individual flow paths 200A can be disposed at a high density.

In the individual flow path 200A, the binder flows from the first common liquid chamber 101 to the second common liquid chamber 102 through the individual flow path 200A. The piezoelectric actuator 300 is driven to cause a pressure change in the binder in the pressure chamber 12, thereby increasing the pressure of the binder in the nozzle 21, so that the binder droplets are ejected from the nozzle toward the outside in the +Z-axis direction. The piezoelectric actuator 300 may be driven when the binder flows from the first common liquid chamber 101 to the second common liquid chamber 102 through the individual flow path 200A, or the piezoelectric actuator 300 may be driven when the binder does not flow from the first common liquid chamber 101 to the second common liquid chamber 102 through the individual flow path 200A. The binder may temporarily flow from the second common liquid chamber 102 to the first common liquid chamber 101 due to the pressure change upon driving of the piezoelectric actuator 300.

The control unit 700, which will be described later, is electrically coupled to each part of the three-dimensional shaping device 1, and controls operation thereof.

The first common liquid chamber 101 and the supply path 203A constitute an inflow path 300A, and the first flow path 201A, the second flow path 202A, and the second common liquid chamber 102 constitute an outflow path 300B. The three-dimensional shaping device 1 includes a circulation flow path 300C that circulates the binder flowing out of the outflow path 300B to the inflow path 300A. In the configuration shown in FIG. 1, the circulation flow path 300C includes the discharge flow path 241, the binder path 282, the binder path 284, the binder path 281, and the supply flow path 231. By providing the circulation flow path 300C, the binder that is not ejected from the nozzle is circulated from the pressure chamber 12 via the outflow path 300B, the circulation flow path 300C, and the inflow path 300A in this order, and returns to the pressure chamber 12 again. According to the configuration, the following advantages can be obtained.

In a binder jet method, a density of a shaped object tends to be lower than those of other methods. Therefore, it is preferable to reduce the amount of the water-soluble resin and the wetting agent contained in the binder. However, simply reducing the amount of the wetting agent lowers the ejection stability. Therefore, as described above, by circulating the binder, the ejection stability can be improved even when the content of the wetting agent is reduced, and the density of the shaped object can be increased.

Although the configuration in which the circulation flow path 300C includes the discharge flow path 241, the binder path 282, the binder path 284, the binder path 281, and the supply flow path 231 has been described above, the disclosure is not limited to the configuration. For example, when the first manifold 230 and the second manifold 240 are coupled, the discharge flow path 241, the supply flow path 231, and a flow path that couples the first manifold 230 and the second manifold 240 constitute the circulation flow path 300C.

A ratio R1/R2 of a flow rate R1 per unit time of the binder ejected from the nozzle 21 to a flow rate R2 per unit time of the binder circulated without being ejected from the nozzle 21, that is, flowing into the outflow path 300B, is preferably 0.05 or more and 20 or less, and more preferably 0.1 or more and 1 or less. Accordingly, the ejection stability of the binder can be further improved.

As shown in FIG. 4, the ejection heads 100 are provided in plural, and the ejection heads 100 are collectively supported by a carriage 500. The carriage 500 may be movable in the X-axis direction or the Y-axis direction. The carriage 500 is provided with heaters 600 for the respective ejection heads 100. Each heater 600 has a function of drying the binder. The control unit 700 is electrically coupled to the heater 600 to control an energization condition by the control unit 700, thereby controlling operation of the heater 600. For example, by repeating an operation of ejecting and drying the binder on a table that is not shown to laminate plural layers, a three-dimensional shaped object can be obtained.

As described above, the three-dimensional shaping device 1 includes the carriage 500 that supports the ejection heads 100 and the heaters 600 that dry the binder. Accordingly, the binder ejected by the ejection heads 100 can be satisfactorily dried. Therefore, moldability of the shaped object can be improved, and device configurations can be simplified. Since a necessary portion of the ejected binder can be dried alone, the binder that is not dried can be recycled.

The heaters 600 may be provided on the table side without being limited to the configuration described above.

The control unit 700 has a function of controlling each part of the three-dimensional shaping device 1. The control unit 700 is configured with, for example, a computer, and includes, for example, at least one processor (for example, a CPU) that processes information, a memory, for example, a ROM or a RAM, which is communicably coupled to the processor, and an external interface that couples to an external device. The memory stores various programs executable by the processor, and the processor can read and execute various programs and the like stored in the memory. A part or all of the components of the control unit 700 may be disposed outside a housing of the three-dimensional shaping device 1.

The memory of the control unit 700 stores a pressure threshold. During shaping, the processor acquires the information on the pressure in the first common liquid chamber 101 based on a detection result of the pressure sensor 400, and determines whether the pressure exceeds the threshold value. When the processor determines that the pressure in the first common liquid chamber 101 exceeds the threshold value, the processor adjusts operation of the vacuum pump 215 shown in FIG. 1 to adjust the pressure in the first common liquid chamber 101.

Specifically, the processor normally operates the vacuum pump 215 under a predetermined condition, and when the pressure in the first common liquid chamber 101 is smaller than the threshold value, the processor changes the energization condition to the vacuum pump 215 so as to set a feeding speed, that is, a circulation speed lower than in the normal state. The memory also stores the energization condition when the pressure in the first common liquid chamber 101 exceeds the threshold value in advance.

Although a configuration in which the pressure sensor 400 is disposed in the inflow path 300A has been described in the present embodiment, the disclosure is not limited the configuration. The pressure sensor 400 may be disposed in any one of the pressure chamber 12, the outflow path 300B, and the circulation flow path 300C.

As described above, the three-dimensional shaping device 1 includes the pressure sensor 400 that detects the pressure of at least one of the pressure chamber 12 which is an individual liquid chamber, the inflow path 300A, the outflow path 300B, and the circulation flow path 300C, and the controller 700 that adjusts the circulation speed of the binder based on the detection result of the pressure sensor 400. Accordingly, for example, the circulation speed of the binder can be kept constant as much as possible, and the ejection stability of the binder can be further improved.

When the pressure is smaller than the threshold value, the control unit 700 controls the operation of the vacuum pump 215 so as to increase the circulation speed of the binder. Accordingly, even when the pressure is reduced, the pressure can be kept constant as much as possible by increasing the circulation speed. As a result, the ejection stability of the binder can be further improved.

Next, the binder ejected from the nozzle 21 will be described.

As described above, the binder includes water, the water-soluble resin, and the wetting agent.

Since the binder contains the water-soluble resin, shape collapse of the shaped object when the shaped object obtained by ejecting the binder is sintered can be prevented or limited.

Examples of the water-soluble resin include a polyvinyl alcohol resin, a polyacrylic acid resin, a cellulose resin, a starch, gelatin, a vinyl resin, an amide resin, an imide resin, an acrylic resin, and a polyethylene glycol. As long as exhibiting a water solubility, these examples may be a homopolymer, a heteropolymer, modified, introduced with known functional groups, or in a form of salt. By using the water-soluble resin, the shape collapse of the obtained shaped object can be effectively prevented or limited.

Examples of the polyvinyl alcohol resin include a polyvinyl alcohol, a modified polyvinyl alcohol modified with acetoacetyl group, acetyl group, silicone or the like, and a butanediol vinyl alcohol copolymer.

The polyacrylic acid resin may be, for example, a polyacrylic acid or a salt such as sodium polyacrylate.

The cellulose resin may be, for example, cellulose or carboxymethyl cellulose.

Examples of the acrylic resin include a polyacrylic acid and an acrylic acid-maleic anhydride copolymer.

Next, the wetting agent will be described.

The wetting agent has a function of limiting drying in the nozzle 21. The wetting agent is preferably an organic solvent having a bp of 200° C. or more.

The wetting agent is not particularly limited as long as it has the function described above, and examples of the wetting agent include alcohols such as ethanol, propanol, and butanol, ethers, and ketones. Specific examples of the wetting agent include 2-butoxyethanol, 1,2,6-hexanetriol, 1,2-butanediol, 1,2-hexanediol, 2-pentanediol, 1,3-dimethyl-2-imidazolidinone, 1,3-butanediol, 1,3-propanediol, 1,4-butanediol, 1,5-pentanediol, 1,6-hexanediol, 2,2-dimethyl-1,3-propanediol, 2,3-butanediol, 2,4-pentanediol, 2,5-hexanediol, 2-ethyl-1,3-hexanediol, 2-pyrrolidone, 2-methyl-1,3-propanediol, 2-methyl-2,4-pentanediol, 3-methyl-1,3-butanediol, 3-methyl-1,3-hexanediol, N-methyl-2-pyrrolidone, N-methylpyrrolidinone, β-butoxy-N,N-dimethylpropionamide, β-methoxy-N,N-dimethylpropionamide, γ-butyrolactone, ε-caprolactam, ethylene glycol, ethylene glycol-n-butyl ether, ethylene glycol-n-propyl ether, ethylene glycol phenyl ether, ethylene glycol mono-2-ethylhexyl ether, ethylene glycol monoethyl ether, glycerin, diethylene glycol, diethylene glycol-n-hexyl ether, diethylene glycol methyl ether, diethylene glycol monoethyl ether, diethylene glycol monobutyl ether, diethylene glycol monomethyl ether, diglycerin, dipropylene glycol, dipropylene glycol n-propyl ether, dipropylene glycol monomethyl ether, dimethyl sulfoxide, sulfolane, thiodiglycol, tetraethylene glycol, triethylene glycol, triethylene glycol ethyl ether, triethylene glycol dimethyl ether, triethylene glycol monobutyl ether, triethylene glycol methyl ether, tripropylene glycol, tripropylene glycol-n-propyl ether, tripropylene glycol methyl ether, trimethylolethane, trimethylolpropane, propylpropylene diglycol, propylene glycol, propylene glycol-n-butyl ether, propylene glycol-t-butyl ether, propylene glycol phenyl ether, propylene glycol monoethyl ether, hexylene glycol, polyethylene glycol, and polypropylene glycol, and one or a combination of two or more of these can be used.

Among these, the wetting agent is preferably an aliphatic diol such as ethylene glycol, 1,4-butanediol, 1,3-propanediol, 2-butoxyethanol, propylene glycol, triethylene glycol, and 2-pyrrolidone. Accordingly, the drying in the nozzle 21 can be limited more reliably, and the effect described above can be exerted with a relatively small amount of the wetting agent.

The wetting agent in the binder preferably has a content of 5% by weight or less, more preferably 4% by weight or less, with respect to the weight of the binder. Accordingly, the density of the shaped object can be sufficiently increased while improving the ejection stability of the binder more reliably.

As described above, the three-dimensional shaping device 1 includes the ejection heads 100 each including: the nozzle 21 that ejects the binder containing water, the water-soluble resin, and the wetting agent, the pressure chamber 12 which is an individual liquid chamber communicating with the nozzle 21, the inflow path 300A that flows the binder into the pressure chamber 12, and the outflow path 300B that flows the binder out of the pressure chamber 12; and the circulation flow path 300C that circulates the binder flowing out of the outflow path 300B to the inflow path 300A. The binder that is not ejected from the nozzle 21 is circulated from the pressure chamber 12 via the outflow path 300B, the circulation flow path 300C, and the inflow path 300A in this order, and returns to the pressure chamber 12 again. In the binder jet method, the density of a shaped object tends to be lower than those of other methods. Therefore, it is preferable to reduce the amount of the water-soluble resin and the wetting agent contained in the binder. However, simply reducing the amount of the wetting agent lowers the ejection stability. Therefore, by circulating the binder as described above, the ejection stability can be improved even when the content of the wetting agent in the binder is reduced, and the density of the shaped object can be increased.

EXAMPLES

Next, specific examples of the disclosure will be described.

Example 1

The three-dimensional shaping device shown in FIG. 1 to FIG. 4 was loaded with a binder, and ejected the binder to obtain a shaped object. A binder including water and a water-soluble resin was used, and polyvinyl alcohol (PVA) was used as the water-soluble resin. The content of water in the binder was 99.2% by mass, and the content of the water-soluble resin in the binder was 0.8% by mass.

Example 2

The three-dimensional shaping device shown in FIG. 1 to FIG. 4 was loaded with a binder, and ejected the binder to obtain a shaped object. A binder including water, a water-soluble resin, and a wetting agent was used, polyvinyl alcohol was used as the water-soluble resin, and 2-butoxyethanol was used as the wetting agent. The content of water in the binder was 98.7% by mass, the content of the water-soluble resin in the binder was 0.8% by mass, and the content of the wetting agent in the binder was 0.5% by mass.

Examples 3 to 18

A binder was ejected in the same manner as in Example 2 except that the content of water, the content of the water-soluble resin, and the content of the wetting agent were changed as shown in Table 1.

Comparative Example 1

A three-dimensional shaping device in the related art in which a circulation flow path is omitted was loaded with a binder, and ejected the binder to obtain a shaped object. A binder including water and a water-soluble resin was used, and polyvinyl alcohol was used as the water-soluble resin. The content of water in the binder was 99.2% by mass, and the content of the water-soluble resin in the binder was 0.8% by mass.

Comparative Example 2

A three-dimensional shaping device in the related art in which a circulation flow path is omitted was loaded with a binder, and ejected the binder to obtain a shaped object. A binder including water, a water-soluble resin, and a wetting agent was used, polyvinyl alcohol was used as the water-soluble resin, and 2-butoxyethanol was used as the wetting agent. The content of water in the binder was 98.7% by mass, the content of the water-soluble resin in the binder was 0.8% by mass, and the content of the wetting agent in the binder was 0.5% by mass.

Comparative Examples 3 to 18

A binder was ejected in the same manner as in Comparative Example 2 except that the content of water, the content of the water-soluble resin, and the content of the wetting agent were changed as shown in Table 2.

Example 19

As shown in Table 3, the three-dimensional shaping device shown in FIG. 1 to FIG. 4 was loaded with a binder, and ejected the binder to obtain a shaped object. A binder including water, a water-soluble resin, and a wetting agent was used, polyvinylpyrrolidone was used as the water-soluble resin, and 2-butoxyethanol was used as the wetting agent. The content of water in the binder was 97.8% by mass, the content of the water-soluble resin in the binder was 0.2% by mass, and the content of the wetting agent in the binder was 2.0% by mass.

Examples 20 to 24

A binder was ejected in the same manner as in Example 2 except that the content of water, the content of the water-soluble resin, and the content of the wetting agent were changed as shown in Table 3.

Comparative Example 19

A three-dimensional shaping device in the related art in which a circulation flow path is omitted was loaded with a binder, and ejected the binder to obtain a shaped object. A binder including water, a water-soluble resin, and a wetting agent was used, polyvinylpyrrolidone was used as the water-soluble resin, and 2-butoxyethanol was used as the wetting agent. The content of water in the binder was 97.8% by mass, the content of the water-soluble resin in the binder was 0.2% by mass, and the content of the wetting agent in the binder was 2.0% by mass.

Comparative Examples 20 to 24

A binder was ejected in the same manner as in Comparative Example 19 except that the content of water, the content of the water-soluble resin, and the content of the wetting agent were changed as shown in Table 4.

Evaluation
1. Ejection Stability
An ejection amount per unit time of the binder ejected from the ejection nozzle was measured and evaluated as follows.
  A: The ejection weight is 98% or more of a target value.
  B: The ejection weight is 95% or more and less than 98% of the target value.
  C: The ejection weight is 90% or more and less than 95% of the target value.
  D: The ejection weight is less than 90% of the target value.
  E: No binder was ejected from the ejection nozzle according to visual check.
2. Density of Shaped Object
  A: The weight of the shaped object after sintering is 60% or more of weight of the shaped object before sintering.
  B: The weight of the shaped object after sintering is 55% or more and less than 60% of the weight of the shaped object before sintering.
  C: The weight of the shaped object after sintering is 50% or more and less than 55% of the weight of the shaped object before sintering.
  D: The weight of the shaped object after sintering is 45% or more and less than 50% of the weight of the shaped object before sintering.
  E: The weight of the shaped object after sintering is less than 45% of the weight of the shaped object before sintering.

A configuration and an evaluation result of the shaped object obtained in each of the examples and the comparative examples are shown in Tables 1 to 4. In the tables, "-" indicates that the shaped object collapsed and thus could not be generated.

TABLE 1

| | Water | 2-butoxy-ethanol | PVA | Stable-ejection circulation head | Density of shaped object |
|---|---|---|---|---|---|
| Example 1 | 99.2 | 0 | 0.8 | A | A |
| Example 2 | 98.7 | 0.5 | 0.8 | A | A |
| Example 3 | 97.2 | 2 | 0.8 | A | A |
| Example 4 | 95.2 | 4 | 0.8 | A | A |

TABLE 1-continued

| | Water | 2-butoxy-ethanol | PVA | Stable-ejection circulation head | Density of shaped object |
|---|---|---|---|---|---|
| Example 5 | 84.2 | 15 | 0.8 | A | B |
| Example 6 | 79.2 | 20 | 0.8 | A | D |
| Example 7 | 99.2 | 0 | 0.8 | A | A |
| Example 8 | 98.7 | 0.5 | 0.8 | A | A |
| Example 9 | 97.2 | 2 | 0.8 | A | A |
| Example 10 | 94.2 | 7 | 0.8 | A | A |
| Example 11 | 84.2 | 15 | 0.8 | A | B |
| Example 12 | 79.2 | 20 | 0.8 | A | D |
| Example 13 | 97.8 | 2 | 0.2 | A | A |
| Example 14 | 97.5 | 2 | 0.5 | A | A |
| Example 15 | 97 | 2 | 1 | A | A |
| Example 16 | 95 | 2 | 3 | A | B |
| Example 17 | 91 | 2 | 7 | A | B |
| Example 18 | 90 | 2 | 8 | A | C |

TABLE 2

| | Water | 2-butoxy-ethanol | PVA | Normal head | Density of shaped object |
|---|---|---|---|---|---|
| Comparative Example 1 | 99.2 | 0 | 0.8 | E | — |
| Comparative Example 2 | 98.7 | 0.5 | 0.8 | E | — |
| Comparative Example 3 | 97.2 | 2 | 0.8 | E | — |
| Comparative Example 4 | 95.2 | 4 | 0.8 | E | — |
| Comparative Example 5 | 84.2 | 15 | 0.8 | D | — |
| Comparative Example 6 | 79.2 | 20 | 0.8 | C | E |
| Comparative Example 7 | 99.2 | 0 | 0.8 | E | — |
| Comparative Example 8 | 98.7 | 0.5 | 0.8 | E | — |
| Comparative Example 9 | 97.2 | 2 | 0.8 | E | — |
| Comparative Example 10 | 94.2 | 7 | 0.8 | D | — |
| Comparative Example 11 | 84.2 | 15 | 0.8 | D | — |
| Comparative Example 12 | 79.2 | 20 | 0.8 | C | D |
| Comparative Example 13 | 97.8 | 2 | 0.2 | E | — |
| Comparative Example 14 | 97.5 | 2 | 0.5 | E | — |
| Comparative Example 15 | 97 | 2 | 1 | E | — |
| Comparative Example 16 | 95 | 2 | 3 | E | — |
| Comparative Example 17 | 91 | 2 | 7 | E | — |
| Comparative Example 18 | 90 | 2 | 8 | E | — |

TABLE 3

| | Example 19 | Example 20 | Example 21 | Example 22 | Example 23 | Example 24 |
|---|---|---|---|---|---|---|
| Water | 97.8 | 97.5 | 97 | 95 | 91 | 90 |
| 2-butoxyethanol | 2 | 2 | 2 | 2 | 2 | 2 |
| PVA | 0.2 | 0.5 | 1 | 3 | 7 | 8 |
| Stable-ejection circulation head | A | A | A | A | A | A |
| Density of shaped object | A | A | A | B | B | C |

TABLE 4

|  | Comparative Example 19 | Comparative Example 20 | Comparative Example 21 | Comparative Example 22 | Comparative Example 23 | Comparative Example 24 |
|---|---|---|---|---|---|---|
| Water | 97.8 | 97.5 | 97 | 95 | 91 | 90 |
| 2-butoxyethanol | 2 | 2 | 2 | 2 | 2 | 2 |
| PVA | 0.2 | 0.5 | 1 | 3 | 7 | 8 |
| Normal head | E | E | E | E | E | E |
| Density of shaped object | — | — | — | — | — | — |

As is clear from Tables 1 to 4, the three-dimensional shaping device without including the circulation flow path 300C in each comparative example exhibited poor ejection stability of the binder. The shaped object manufactured by the three-dimensional shaping device without including the circulation flow path 300C in each comparative example had a low density, or the shaped object collapsed, and the density could not be measured. In contrast, the three-dimensional shaping device including the circulation flow path 300C in each example exhibited excellent ejection stability of the binder. The density of the shaped object was high, and a satisfactory result was obtained.

Although the three-dimensional shaping device according to the disclosure has been described with reference to the illustrated embodiment, the disclosure is not limited thereto. Each part constituting the three-dimensional shaping device can be replaced with a unit having any configuration capable of exhibiting the same function. Any component may be added.

What is claimed is:

1. A three-dimensional shaping device, comprising:
    a binder storage configured to store a binder containing water, a water-soluble resin, and a wetting agent;
    a first depressurizing sub-tank configured to receive and store the binder;
    a first pressurizing sub-tank configured to receive and store the binder;
    an ejection head including a nozzle configured to eject the binder, an individual liquid chamber communicating with the nozzle, an inflow path configured to flow the binder into the individual liquid chamber from a first manifold, and an outflow path configured to flow the binder out of the individual liquid chamber to a second manifold, the inflow path comprising a first common liquid chamber configured to receive the binder;
    a circulation flow path configured to circulate the binder flowing out of the second manifold in fluid communication with the outflow path to the first manifold in fluid communication with the inflow path and through the first depressurizing sub-tank, a deaeration device, and the first pressurizing sub-tank in that order, the binder storage being disposed outside of the circulation flow path;
    a first pressure sensor disposed within the first common liquid chamber of the ejection head and configured to detect pressure of the binder within the first common liquid chamber of the ejection head; and
    a control unit configured to adjust a circulation speed of the binder based on a detection result of the first pressure sensor and increase the circulation speed of the binder when the pressure is smaller than a threshold value, the control unit being configured to adjust an operation of vacuum pump to adjust a pressure in the first common liquid chamber.

2. The three-dimensional shaping device according to claim 1, wherein
    the wetting agent has a content in the binder of 5% by weight or less with respect to a weight of the binder.

3. The three-dimensional shaping device according to claim 1, wherein
    the wetting agent contains an aliphatic diol.

4. The three-dimensional shaping device according to claim 1, wherein
    the water-soluble resin is at least one selected from the group consisting of a polyvinyl alcohol resin, a polyacrylic acid resin, a cellulose resin, a starch, gelatin, a vinyl resin, an amide resin, an imide resin, an acrylic resin, and a polyethylene glycol.

5. The three-dimensional shaping device according to claim 1, further comprising:
    a carriage configured to support the ejection head and a heater configured to dry the binder.

6. The three-dimensional shaping device according to claim 1 wherein
    a second pressure sensor is configured to detect a pressure of at least one of the individual liquid chamber, the inflow path, the outflow path, and the circulation flow path.

* * * * *